Patented Feb. 25, 1930

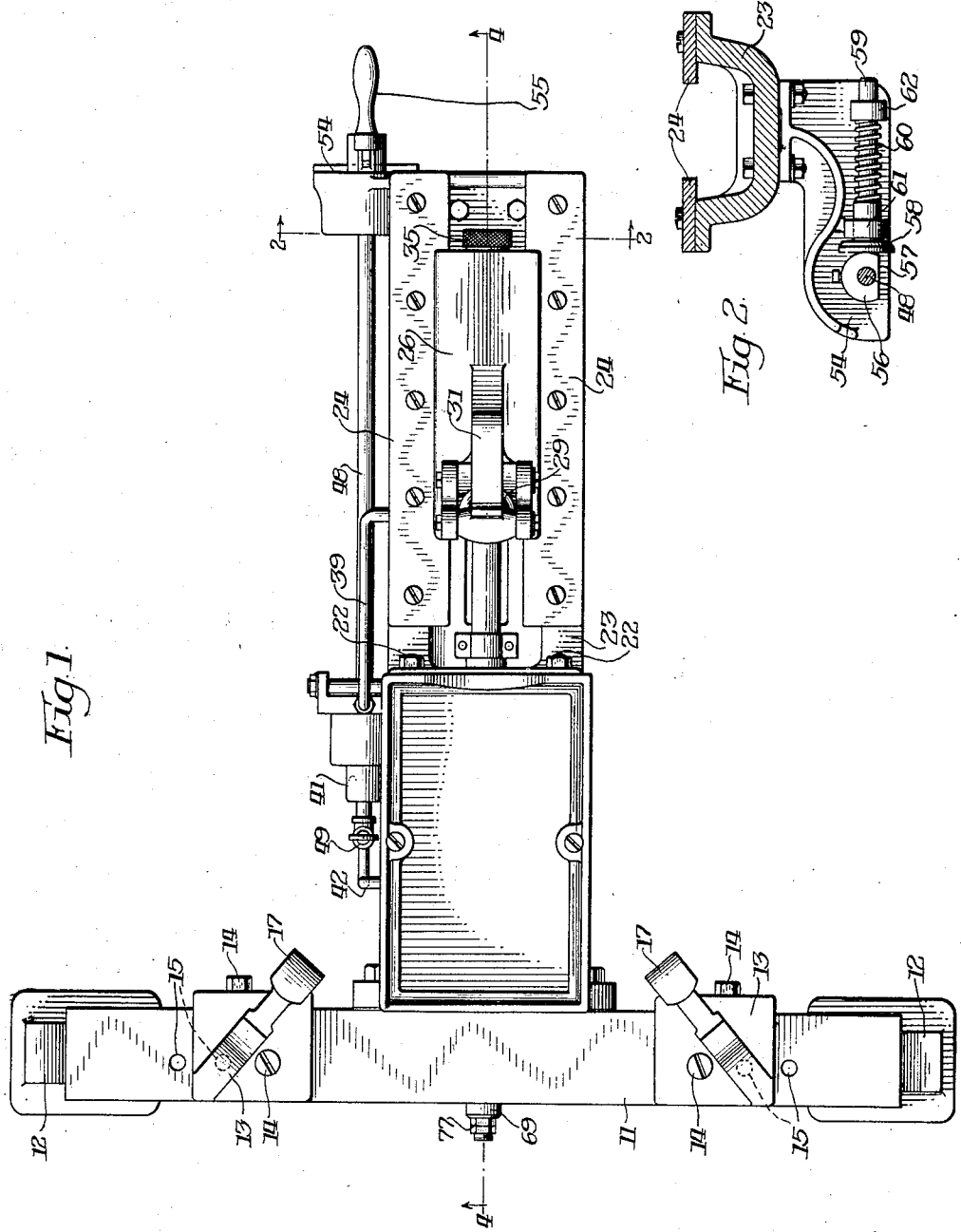

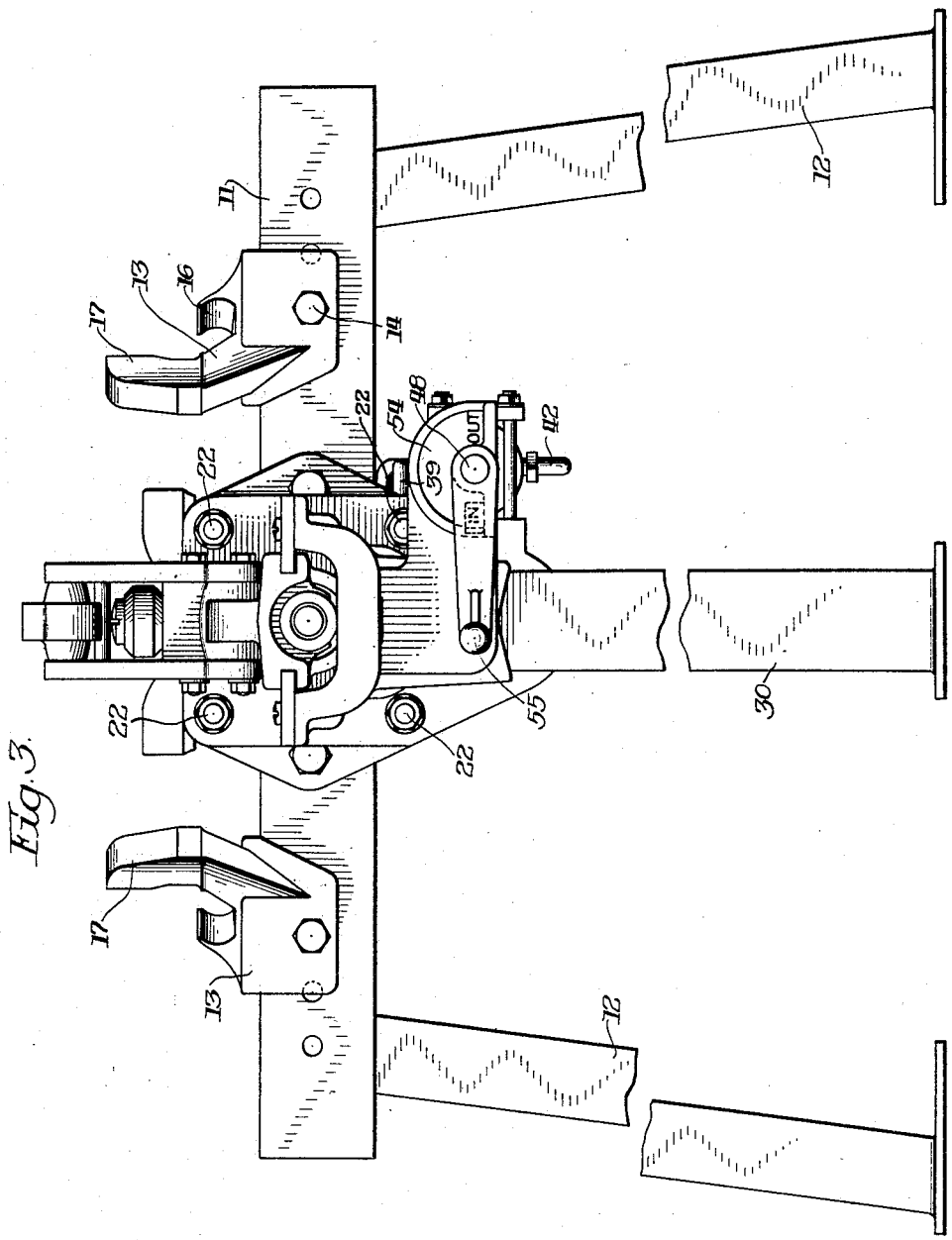

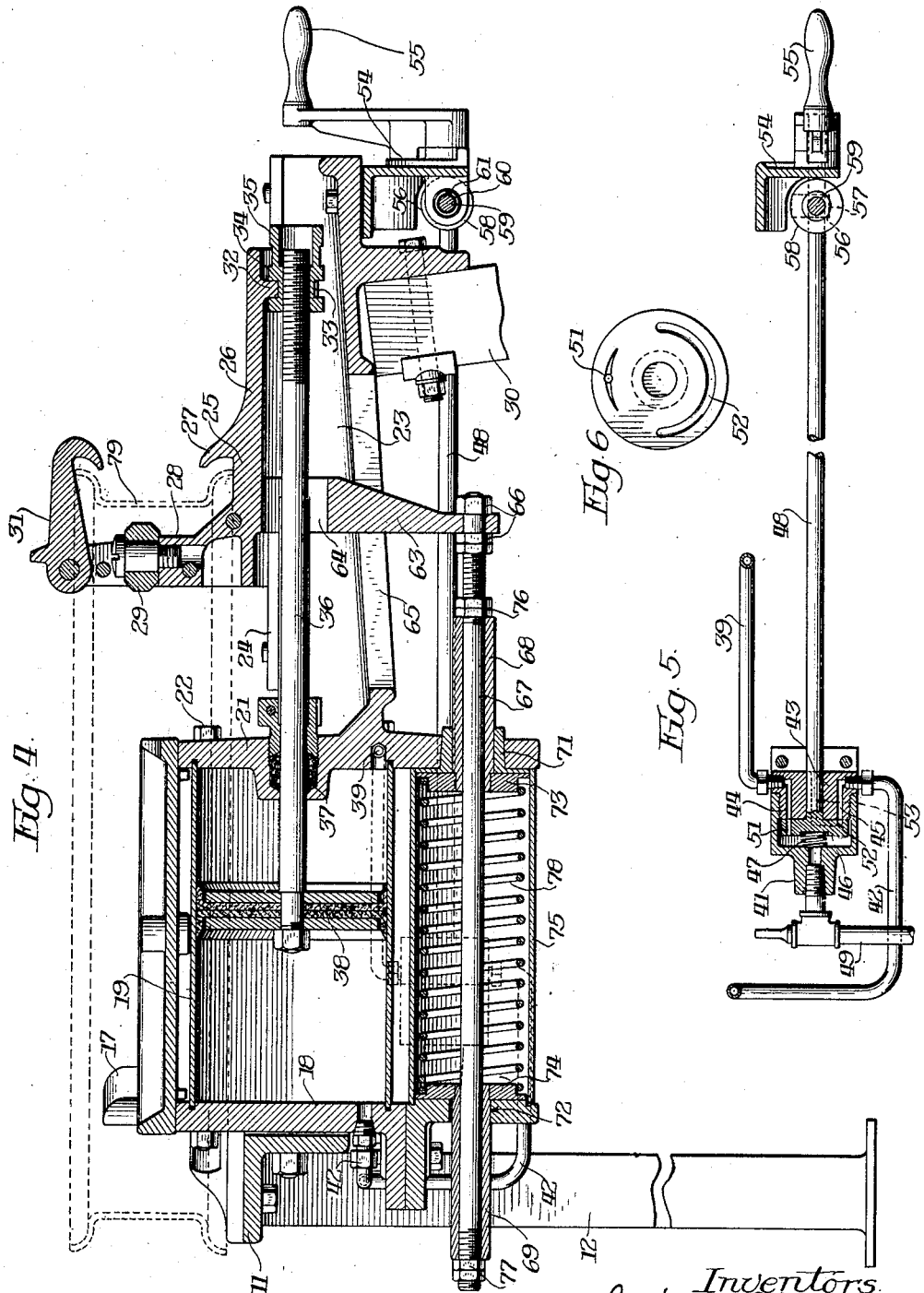

1,748,092

UNITED STATES PATENT OFFICE

GAILARD E. WEAVER AND EARL K. HALL, OF SPRINGFIELD, ILLINOIS, ASSIGNORS TO WEAVER MANUFACTURING COMPANY, OF SPRINGFIELD, ILLINOIS, A CORPORATION OF ILLINOIS

TIRE CHANGER

Application filed December 3, 1928. Serial No. 323,247.

The present invention relates to rim and tire manipulating machines and aims particularly, but not necessarily limitingly, to provide an appliance of this general character especially adapted for the applying of tires to split rims in automobile factories, where it is indispensable that such work should be performed rapidly and efficiently.

As will be readily understood, in production work of that type, the speed at which the work may be handled is of prime importance, and, when a tire has been mounted on its rim, considerable time might be consumed in bringing the movable jaw of the rim contracting and expanding device into proper position and maintaining it there until the tire and its rim attached have been removed and another rim placed on the jaws of the machine ready to be sprung into its tire.

One aim, therefore, of the invention is to supply an apparatus of this type constructed to cause the movable rim-engaging jaw to return automatically to a predetermined position as soon as the power-actuated operating means will permit, the novel appliance also incorporating other desirable structural features which will become apparent from a consideration of a present, desirable and preferred embodiment of the invention illustrated in detail in the accompanying drawings, forming a part of this specification, and throughout the several views of which like reference characters have been used to designate the same parts.

In these drawings:

Figure 1 is a plan view of the novel and improved mechanism;

Figure 2 is a cross-section on line 2—2 of Figure 1;

Figure 3 is a front elevation of the machine;

Figure 4 is a longitudinal vertical section through the appliance on line 4—4 of Figure 1;

Figure 5 shows in section the valve for controlling the compressed air and its operating mechanism; and Figure 6 is a face view of the valve disk proper.

The positions of the parts are not necessarily the same in all of the views.

Referring to these drawings, it will be perceived that the new machine includes a horizontal cross-bar 11 of angle-bar cross-section mounted on the tops of a pair of inclined, supporting legs 12, 12, such bar adjustably carrying a pair of obliquely-disposed rim-engaging members or jaws 13, 13, the base of each of which may be moved along the bar and secured in any one of a number of adjusted positions, for the accommodation of rims of different diameters, by securing screws or bolts 14, 14, each designed to engage any one of a series of spaced holes 15 in the bar.

Each such jaw has a shallow, outer, inwardly-facing hook 16 adapted to engage the lower flange of a rim and to contract the latter when the apparatus is operated to perform that function, and it also has an upstanding lug or projection 17 designed to bear on the inner face of the rim and to expand the latter during the action of the appliance carrying out that operation.

A cylinder-head 18 is bolted to the face of the supporting-bar 11, and a cylinder-shell 19 is clamped between such head and a companion one 21 at the other end of the shell by means of a number of bolts 22, 22 extended through both heads.

Head 21 has a trough-shaped arm 23 extended therefrom and the top surfaces of the latter have guide-plates 24, 24 secured thereto and overhanging the space in the arm, for the purpose of slidingly supporting a movable or reciprocatory jaw-member, characterized as a whole 25, and comprising a base 26, a hook 27 similar to the hooks 16, an upstanding part 28 carrying a rim-engaging roller 29 and a pivoted hook 31.

The front end of arm 23 is conveniently supported on a third inclined leg 30, as shown in the various figures of the drawings.

Internally the base 26 has a slotted rib or fin 32 fitting in an annular, external groove 33 of a nut 34 having an accessible knurled extension 35 by means of which it may be adjusted.

Such nut is on the screw-threaded end portion of a piston-rod 36 slidable through a stuffing-box 37 in the cylinder-head 21 and secured at its inner end to a suitable piston or plunger 38 reciprocatory in the cylinder 19, all as will be readily understood from the illustration.

One end of the cylinder-chamber is connected by a pipe 39 to a controlling-valve, designated as a whole 41, and the opposite end of such chamber is similarly joined to the valve by a conduit 42, the valve comprising a member 43 with passages 44, 45 connected to the pipes 39 and 42 respectively.

An oscillatory disc valve 46, inside of the valve-casing, is pressed or forced against the flat face of member 43 by an appropriate spring 47, the element 46 being fixed on the end of a shaft 48 having a bearing in the part 43.

The interior of the valve-shell is supplied with compressed-air through a suitable pipe 49, the valve-disc having a port 51 extended therethrough and a curved groove or port 52 on that one of its faces bearing on the member 43, the casing having a port 53 leading to the atmosphere.

When the valve-disc is in one terminal position, the compressed air flows through the ports 51 and 44 and pipe 39 into one end of the cylinder 19, the opposite end of the cylinder being then connected to the outer air through pipe 42 and ports 45, 52 and 53, and, when the disc-valve is in its other extreme position, these connections are reversed, but when the valve-disc is in its central or intermediate position, the compressed-air supply will be cut off from both ends of the cylinder and both of them will be connected to the atmosphere through the curved port 52, which, under such circumstances, registers with both ports 44 and 45.

The front end portion of shaft 48 turns in a bearing in a bracket 54 mounted on the under side of arm or support 23, and the extreme end of the shaft is fitted or equipped with a handle 55 by means of which the shaft may be readily and easily turned or rocked.

To the rear of bracket 54, shaft 48 has a cam 56 secured thereto, as by a set-screw, such cam being cylindrical except that it has a flat face 57.

This cam cooperates with a circular disc 58 on a shouldered shaft 59 slidable in bearings 61 and 62 at right-angles to the axis of shaft 48, a coiled spring 60 surrounding the reduced-diameter section of the shaft and pressing at one end against the bearing 62 and at its other end against the shoulder of the shaft, whereby it always forces the disc 58 out against the cam 56.

When handle 55 is in its neutral upright position, the flat surface 57 is bearing flatwise on the correlated plain face of the disc 58, whereby the handle is yieldingly maintained in such normal position.

If the handle is turned in either direction sufficiently to establish the corresponding port connections and then released, the pressure of disc 58 on the flat cam surface will restore the handle and the shaft automatically to its original neutral position, but, on the other hand, if it is desired to have the handle held in either one of its operative positions, it is turned enough in that direction to bring its cylindrical surface in contact with the disc 58, and, accordingly, the latter cannot restore the handle and shaft to middle position until the handle is first started manually in that direction sufficiently to carry the round part of the cam away from the complementary, spring-actuated disc to allow the latter to act on its then obliquely-disposed flat face, whereupon the cam will be turned by the disc to neutral relation.

To restore the movable jaw automatically to its normal, predetermined, intermediate position to facilitate the removal of the assembled tire and rim and to aid in the quick placement in position of the next rim on the machine for application thereto of its tire, the following specified cooperating elements have been employed.

Jaw-member 25 has a depending arm 63 integral therewith and provided with an aperture 64 therethrough to accommodate the piston-rod 36, such arm extending down through a longitudinal slot 65 in the arm 23, the lower end of arm 63, by means of nuts 66 being adjustably attached to the threaded end portion of a round rod 67 fitted with a pair of oppositely-arranged sleeves 68 and 69 slidable in suitably-supported bearings 71 and 72, each such sleeve having a shouldered terminal disc 73, 74, respectively, fixed thereto and located inside of a supplemental cylinder 75 positioned below the main cylinder 19.

Nuts 76 on shaft 67 coact with an end of sleeve 68 and similar nuts 77 also on shaft 67 cooperate with the opposite end of the other sleeve 69.

An appropriate, coiled spring 78 in cylinder 75 bears against and functions in connection with the shoulders of the two discs 73 and 74 of the pair of sleeves.

When handle 55 is in its upright or neutral position, both ends of cylinder 19 are connected to the outer atmosphere by reason of the position of the valve-disc 46, and the movable jaw member 25 will be in its predetermined, intermediate position, as shown in Figure 4, due to the action of spring 78 pressing equally on both sleeves.

Assuming now, that a rim 79, shown in dotted lines, has been placed on the three jaw members, with the hook 31 coacting with its upper flange, provided the element 31 is used, it being swung back out of the way when not to be employed, and, that it is first desired to contract the rim for the application of the tire thereto, the operator turns the handle 55 to the left, as viewed in Figure 3, to allow compressed air to enter the power-cylinder through pipe 39 and to connect the other end of the cylinder to the atmosphere through the pipe 42, thus causing the inward travel of the piston and the movable jaw member, whereby the hooks 16, 16 and 27 cause the contraction of the rim, whereupon the tire may be readily applied to it.

Of course, during such inward movement of the jaw member 25, the sleeve 69 remains stationary due to its disc 74 bearing against the face of the bearing member 72, but the other sleeve 68 slides in, compressing the interposed spring 78, owing to the action of the inwardly-moving nuts or abutments 76 cooperating with its adjacent end.

The rim having been thus reduced in diameter with its ends overlapped and the tire having been applied to it, the workman turns the handle to the right sufficiently to cause a reversal of the air connections, hence effecting the outward movement of the piston and movable jaw member, thus expanding the rim and causing its proper and correct application to the tire, and, of course, during this action the stationary abutments 17, 17 and the roller 29 on the traveling post 28 do the required work.

During such operation, spring 78 becomes compressed by reason of the sleeve 68 remaining stationary and the sleeve 69 moving to the right, as the parts are viewed in Figure 4.

As soon as the handle 55 is returned to, or allowed automatically to be restored to, its middle or neutral position, in which both ends of the power-cylinder are directly connected to the atmosphere, spring 78 is free to expand, practically unrestrained, and, in so doing, it moves jaw-member 25 inwardly automatically to its original intermediate position, thus aiding the removal of the assembled rim and tire from the machine and placing the movable jaw in position for the reception of the next rim.

It will be noticed that as soon as the air-valve controlling-handle is shifted or allowed to assume its normal or neutral middle position, the movable jaw will be at once restored to its predetermined, intermediate position, regardless of whether it is required to move inwardly or outwardly to reach that location.

Owing to the permissible adjustment between the arm 63 and the rod 67, the appliance may be readily set for working on rims of various sizes, the adjustability of the stationary jaws 13, 13 being also availed of for this purpose.

Those acquainted with or trained in this art will readily comprehend that the invention is not limited and restricted to the particular embodiment set forth in detail and that many more or less radical changes may be incorporated in the structure without departure from the heart and essence of the invention and without the sacrifice of any of its material benefits and advantages.

We claim:

1. In a rim-operating machine, the combination of jaw means to engage a rim, operating-means to cause said jaw means to expand or to contract the rim, and means to cause at least some of said jaw means to move automatically to an intermediate position when permitted to do so by the condition of said operating-means.

2. In a rim-operating machine, the combination of stationary means to hold a rim, a movable rim-engaging jaw, means to move said jaw, and spring means strained when said movable jaw is moved in either direction from an intermediate position and acting to restore said jaw automatically to such position when permitted to do so by said jaw-moving means.

3. In a rim-operating machine, the combination of means to hold a rim, a movable rim-engaging jaw, means to move said jaw to deform the rim, including a power-cylinder, a power-piston reciprocatory therein, and means connecting said piston and jaw, a valve controlling fluid entrance into and discharge from both ends of said cylinder, a handle controlling said valve, means to restore said handle automatically when released to a neutral position corresponding to a piston inoperative condition of said valve, and means to restore said jaw and piston to a predetermined position other than by said fluid when said handle is in said neutral position.

4. In a rim-operating machine, the combination of means to hold a rim, a movable rim-engaging jaw, means to move said jaw to deform the rim including a power-cylinder, a power-piston reciprocatory therein, and means connecting said piston and jaw, a valve controlling fluid entrance into and discharge from both ends of said cylinder, a handle to actuate said valve, means to restore said handle automatically when released to a neutral position corresponding to a piston inoperative condition of said valve, and spring means put under strain when said jaw and piston are moved from a predetermined position and acting to restore said jaw and piston automatically to such predetermined position when said handle is in said neutral position.

5. In a rim-operating machine, the combination of means to hold a rim, a movable rim-engaging jaw, means to move said jaw to deform said rim, including a power-cylinder, a power-piston reciprocatory therein, and means connecting said piston and jaw, a valve controlling fluid entrance into and discharge from both ends of said cylinder, a handle to actuate said valve, means to restore said handle automatically when released to a neutral position corresponding to a piston inoperative condition of said valve, and spring means put under strain when said jaw and piston are moved in either direction from a predetermined intermediate position and acting to restore said jaw and piston to such position automatically when said handle is in said neutral position.

6. In a rim-operating machine, the combination of power-actuated means to operate a tire-rim, a handle governing the actuation of said rim-operating means, means to restore said handle automatically when released to a predetermined position, and means to restore said rim-operating means automatically to a predetermined condition other than by said power when said handle is in its said predetermined position.

In witness whereof we have hereunto set our hands.

GAILARD E. WEAVER.
EARL K. HALL.